(12) United States Patent
Martignoni

(10) Patent No.: US 9,595,067 B2
(45) Date of Patent: Mar. 14, 2017

(54) CORRECTING ERRORS IN MORTGAGE APPLICATIONS

(71) Applicant: ReverseVision, Inc., Raleigh, NC (US)

(72) Inventor: Thomas M. Martignoni, Raleigh, NC (US)

(73) Assignee: ReverseVision, Inc., San Diego, CA (US)

( * ) Notice: Subject to any disclaimer, the term of this patent is extended or adjusted under 35 U.S.C. 154(b) by 0 days.

(21) Appl. No.: 15/048,067

(22) Filed: Feb. 19, 2016

(65) Prior Publication Data

US 2016/0171602 A1 Jun. 16, 2016

Related U.S. Application Data

(63) Continuation of application No. 14/541,227, filed on Nov. 14, 2014, now Pat. No. 9,299,105, which is a continuation of application No. 11/516,440, filed on Sep. 6, 2006, now Pat. No. 8,935,379.

(60) Provisional application No. 60/715,233, filed on Sep. 7, 2005.

(51) Int. Cl.
| | | |
|---|---|---|
| *G06F 15/173* | (2006.01) | |
| *G06Q 40/02* | (2012.01) | |
| *H04L 29/08* | (2006.01) | |
| *G06F 17/24* | (2006.01) | |
| *G06Q 50/16* | (2012.01) | |

(52) U.S. Cl.
CPC ......... *G06Q 40/025* (2013.01); *G06F 17/243* (2013.01); *G06Q 40/02* (2013.01); *G06Q 50/16* (2013.01); *H04L 67/12* (2013.01)

(58) Field of Classification Search
CPC .... G06Q 40/02; G06Q 40/025; G06F 17/243; H04L 67/12
See application file for complete search history.

(56) References Cited

U.S. PATENT DOCUMENTS

| | | |
|---|---|---|
| 5,323,315 A | 6/1994 | Highbloom |
| 5,461,708 A | 10/1995 | Kahn |
| 5,704,029 A | 12/1997 | Wright, Jr. |
| 5,767,854 A | 6/1998 | Anwar |
| 5,787,262 A | 7/1998 | Shakib et al. |
| 5,878,404 A | 3/1999 | Stout |
| 5,966,693 A | 10/1999 | Burgess |
| 5,983,206 A | 11/1999 | Oppenheimer |
| 5,991,745 A | 11/1999 | Kiritz |
| 6,012,047 A | 1/2000 | Mazonas et al. |
| 6,021,202 A | 2/2000 | Anderson et al. |
| 6,029,144 A | 2/2000 | Barrett et al. |
| 6,064,984 A | 5/2000 | Ferguson |
| 6,167,523 A | 12/2000 | Strong |
| 6,209,095 B1 | 3/2001 | Anderson et al. |

(Continued)

OTHER PUBLICATIONS

U.S. Appl. No. 11/396,155, Martignoni.

(Continued)

*Primary Examiner* — Richard G Keehn
(74) *Attorney, Agent, or Firm* — Scott P. Zimmerman, PLLC

(57) ABSTRACT

Methods, systems, and products determine a cost to correct mortgage applications. When electronic data is submitted in an electronic mortgage application form, the electronic data is checked for errors. If an error is determined, a cost to resolve the error is also determined.

18 Claims, 6 Drawing Sheets

(56) References Cited

U.S. PATENT DOCUMENTS

| | | |
|---|---|---|
| 6,233,566 B1 | 5/2001 | Levine et al. |
| 6,373,483 B1 | 4/2002 | Becker |
| 6,438,526 B1 | 8/2002 | Dykes et al. |
| 6,490,601 B1 | 12/2002 | Markus et al. |
| 6,505,176 B2 | 1/2003 | DeFrancesco, Jr. et al. |
| 6,571,216 B1 | 5/2003 | Garg et al. |
| 6,842,176 B2 | 1/2005 | Sang'udi |
| 6,904,412 B1 | 6/2005 | Broadbent et al. |
| 6,910,179 B1 | 6/2005 | Pennell et al. |
| 7,089,503 B1 | 8/2006 | Bloomquist et al. |
| 7,110,956 B1* | 9/2006 | Drake, Jr. ........ G05B 19/41865 705/35 |
| 7,234,103 B1* | 6/2007 | Regan .................... G06Q 10/00 705/19 |
| 7,305,129 B2* | 12/2007 | Chellapilla ........... G06F 17/243 382/174 |
| 7,336,256 B2 | 2/2008 | Parzygnat et al. |
| 7,593,890 B1* | 9/2009 | Bradley ................ G06Q 40/00 705/38 |
| 7,603,301 B1* | 10/2009 | Regan .................... G06Q 10/10 705/30 |
| 7,743,150 B1* | 6/2010 | Carter .................... G06F 9/546 370/241 |
| 8,103,565 B2 | 1/2012 | Buerger et al. |
| 8,935,379 B1 | 1/2015 | Martignoni |
| 9,098,882 B2 | 8/2015 | Martignoni |
| 2001/0044734 A1* | 11/2001 | Walker .................. G06Q 40/02 705/4 |
| 2001/0047326 A1 | 11/2001 | Broadbent |
| 2002/0023060 A1* | 2/2002 | Cooney .................. G06Q 10/06 705/400 |
| 2002/0035520 A1 | 3/2002 | Weiss |
| 2002/0040339 A1 | 4/2002 | Dhar et al. |
| 2002/0055905 A1 | 5/2002 | Jannah et al. |
| 2002/0116107 A1* | 8/2002 | Mahoney ................ A01B 63/00 701/50 |
| 2002/0169694 A1* | 11/2002 | Stone ...................... G06Q 10/00 705/5 |
| 2003/0018558 A1* | 1/2003 | Heffner .................. G06Q 40/02 705/37 |
| 2003/0036994 A1 | 2/2003 | Witzig |
| 2003/0040297 A1* | 2/2003 | Pecen .................... H04L 12/14 455/406 |
| 2003/0144949 A1 | 7/2003 | Blanch |
| 2003/0172025 A1 | 9/2003 | Gallina |
| 2003/0225679 A1 | 12/2003 | Tenorio |
| 2004/0021708 A1 | 2/2004 | Lay et al. |
| 2004/0090472 A1 | 5/2004 | Risch |
| 2004/0098220 A1* | 5/2004 | Gong ................ G05B 19/4097 702/155 |
| 2004/0117233 A1* | 6/2004 | Rapp, III ........... G05B 19/4183 700/96 |
| 2004/0181749 A1* | 9/2004 | Chellapilla ........... G06F 17/243 715/222 |
| 2004/0199456 A1 | 10/2004 | Flint |
| 2004/0205772 A1* | 10/2004 | Uszok .................... H04L 29/06 719/317 |
| 2005/0108123 A1* | 5/2005 | Schneider .............. G06Q 20/10 705/35 |
| 2005/0108136 A1* | 5/2005 | Schneider .............. G06Q 40/06 705/36 R |
| 2005/0138382 A1 | 6/2005 | Hougaard et al. |
| 2005/0177508 A1 | 8/2005 | Pembroke |
| 2005/0198563 A1* | 9/2005 | Kristjansson ......... G06F 17/243 715/224 |
| 2005/0216824 A1* | 9/2005 | Ferguson .......... G06F 17/30867 715/205 |
| 2005/0234791 A1 | 10/2005 | Krasnerman |
| 2005/0278249 A1 | 12/2005 | Jones |
| 2005/0288955 A1* | 12/2005 | Lewiss-Hachmeister ........ G06Q 40/025 705/38 |
| 2005/0289046 A1 | 12/2005 | Conyack, Jr. |
| 2006/0080368 A1* | 4/2006 | Orumchian ....... G06F 17/30321 |
| 2006/0095229 A1* | 5/2006 | Kanevsky ................ G01D 1/14 702/181 |
| 2006/0155620 A1* | 7/2006 | Tsurubayashi .......... G06F 21/10 705/35 |
| 2006/0161920 A1* | 7/2006 | An .......................... G06F 9/485 718/102 |
| 2006/0178918 A1 | 8/2006 | Mikurak |
| 2006/0282359 A1* | 12/2006 | Nobili .................... G06Q 40/02 705/35 |
| 2006/0287908 A1 | 12/2006 | Orumchian et al. |
| 2007/0288354 A1 | 12/2007 | LeClair et al. |
| 2007/0288361 A1 | 12/2007 | Martignoni |
| 2008/0027845 A1 | 1/2008 | Dreyer et al. |
| 2008/0205699 A1 | 8/2008 | Kuraki et al. |
| 2008/0320600 A1 | 12/2008 | Pandiscia et al. |
| 2009/0025063 A1 | 1/2009 | Thomas |
| 2009/0037232 A1 | 2/2009 | Dubitsky et al. |
| 2009/0150169 A1 | 6/2009 | Kirkwood et al. |
| 2011/0153490 A1 | 6/2011 | Martignoni |
| 2015/0073976 A1 | 3/2015 | Martignoni |
| 2015/0310226 A1 | 10/2015 | Martignoni |

OTHER PUBLICATIONS

Billy Hollis, Validator Controls for Windows Forms, Apr. 18, 2003 pp. 22 http://msdn.microsoft.com/library/default.asp?url=/library/en-us/dnadvnet/html/vbnet04082003.asp.

Hong, Peter J. & Reza, Marcos, "Hidden Cost to Homeowners: The Prevalent Non-Disclosure of Yield Spread Premiums in Mortgage Loan Transactions", Loyola Consumer Law Review, 2005, 15 pages.

* cited by examiner

CORRECTING ERRORS IN MORTGAGE APPLICATIONS

CROSS-REFERENCE TO RELATED APPLICATIONS

This application is a continuation of U.S. application Ser. No. 14/541,227 filed Nov. 14, 2014 and since issued as U.S. Pat. No. 9,299,105, which is a continuation of U.S. application Ser. No. 11/516,440 filed Sep. 6, 2006 and since issued as U.S. Pat. No. 8,935,379, which claims the benefit of U.S. Provisional Application 60/715,233 filed Sep. 7, 2005, with all applications incorporated herein by reference in their entireties.

NOTICE OF COPYRIGHT PROTECTION

A portion of the disclosure of this patent document and its figures contain material subject to copyright protection. The copyright owner has no objection to the facsimile reproduction by anyone of the patent document or the patent disclosure, but otherwise reserves all copyrights whatsoever.

BACKGROUND

The exemplary embodiments relate to quantifying the quality of the way electronic forms are filled out and electronic data is submitted.

In the mortgage application process it is often a broker who takes the application while a separate entity, a processor, processes and closes the loan. The broker together with the applicant fills out application relevant forms, collects information and assembles a dossier. Both parties (the broker and the processor) do have slightly different objectives. The broker wants to minimize his or her workload by completing the forms as quickly as possible. Completeness and the quality of the data is not a high priority; the application has to be just "good" enough that the processor accepts it. For the broker a missing phone number or even a missing social security number or implausible social security number (such as a number with not enough digits) may be acceptable. Incorrect or missing entries however create work for the processor who either will reject the submitted documents or will have to research the missing entries.

Another similar situation arises when people fill out forms over the Internet. Generally some kind of verification is performed and the forms are either accepted or rejected based on the verification method.

Microsoft's Visual Studio offers a solution for evaluating forms. Visual Studio 2005 is the latest MICROSOFT® development platform for software development (MICROSOFT® is a registered trademark of Microsoft Corporation, One Microsoft Way, Redmond Wash. 98052-6399, 425.882.8080). Visual Studio 2005 will be released by late 2005 or early 2006. Visual Studio 2005 includes a typical framework for form validation. Microsoft explains the use of validation as:

If any of the validators are found to be in error, the submission of the form to the server is cancelled and the validator's text property is displayed. This permits the user to correct the input before submitting the form to the server.

See http://samples.gotdotnet.com/quickstart/aspplus/doc/webvalidation.aspx (Sep. 4, 2005). As those of ordinary skill in the art recognize, "validators" are objects with methods to verify the validity of an entry in a field of a control. As pointed out in the above statement, the validators have two states: i) indicating an error or ii) no error. An error meaning that the entry into the control validated by the validator is invalid. If any validator on a form indicates an error, then the form is rejected by the server and the user has no other option than to either not submit the form or correct the error.

Other sources also discuss validation methods. Another Microsoft website contains an article by Mr. Billy Hollis on the use of "ErrorProviders." This website article contains a screen shot at http://msdn.microsoft.com/library/default-.asp?url=/library/en-us/dnadvnet/html/vbnet04082003.asp (Sep. 5, 2005). This screenshot shows that some input controls do have errors indicated by the icon of the error control. Mr. Hollis discusses different ways on how to recognize errors in data entered into controls and how to give a feedback to the user, based on these errors. But the website doesn't address the question of what to do if errors are recognized—meaning that invalid or no data has been entered by the user. The website simply assumes that the user is forced to correct the invalid data.

U.S. Pat. No. 5,704,029 takes a serial approach. As this patent explains, "running the script may check to see that the field was answered correctly and if so, go to the next appropriate field." This patent also uses an "either or" decision. An error of violation of a rule blocks the whole process.

Despite all these conventional solutions, in many cases it would be preferable to have a more subtle decision process than just accept or reject a form or a set of forms. Even with a missing entry an application or order may be of value. Given the missing information however, the application would be of lesser value. Thus completely rejecting the application just because of a missing or invalid entry may not be a good business decision. But neither is it a good business decision to let a broker supply incomplete applications or to accept any incomplete or invalid application, as this creates additional costs to the processor. There is, then, a need in the art for quantifying the quality of the data and completeness of electronic forms and the quality of submitted electronic data.

SUMMARY

The aforementioned problems, and other problems, are reduced, according to the exemplary embodiments, by methods, systems, and products that evaluate electronic data and electronic forms. The exemplary embodiments provide a more sophisticated evaluation process for electronic forms and electronic data than just merely accepting or rejecting the forms. Each entry in a form is evaluated for its completeness, plausibility, and value. Instead of outright rejecting the whole form (or set of forms) because of incorrect or missing entries, a cost for the errors is established. The cost (or the method how this cost is evaluated) may be defined by the party that will receive the form or its content. Prior to submitting the form the submitting party can review a cost evaluation based on each entry in the form. It is then the decision of the submitting party whether to submit an incomplete or inconsistent form or whether to correct the form or parts of it prior to submission. This decision can be made based on the cost.

DESCRIPTION OF THE DRAWINGS

These and other features, aspects, and advantages of the embodiments are better understood when the following Detailed Description is read with reference to the accompanying drawings, wherein.

DETAILED DESCRIPTION

Figure 1:
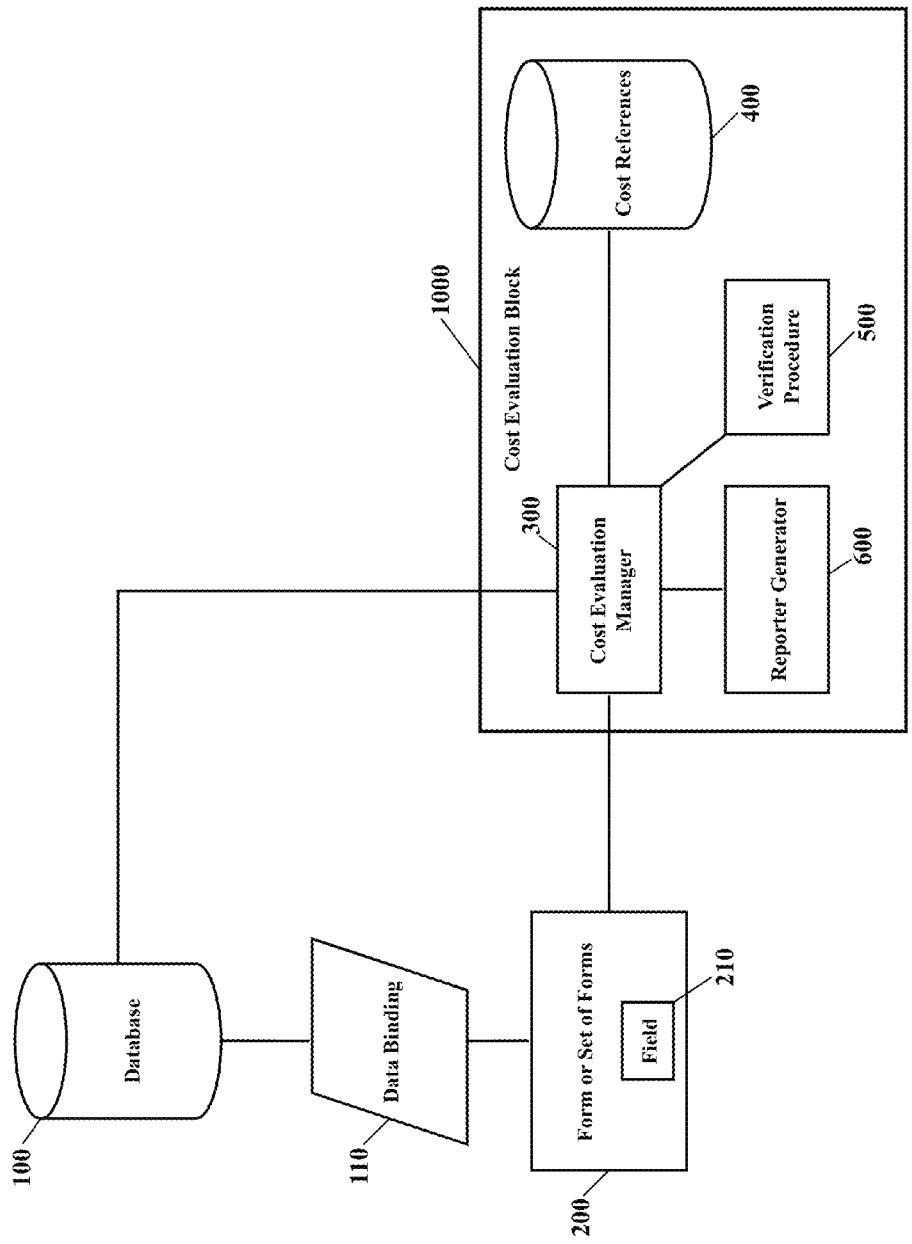
FIG. 1 is a schematic illustrating exemplary embodiments.

Exemplary embodiments will now be described more fully hereinafter with reference to the accompanying drawings, in which exemplary embodiments are shown. The exemplary embodiments, however, may be embodied in many different forms and should not be construed as limited to the embodiments set forth herein. These embodiments are provided so that this disclosure will be thorough and complete and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating the exemplary embodiments. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named manufacturer, technology language or standard.

DEFINITIONS

The following definitions are provided to the reader.

Input Control or simply control—A control that accepts user input into one or more fields, including but not limited to textboxes, comboboxes, lists . . . . If a control has only one field, a field can be referenced by its control and vise versa.

Table—Unless otherwise specified table refers to a table in the database or another structured data object such as XML data, dataset, datatable, that may or may not be tied to a form or more than one form through databinding.

Databinding—Databinding is a well understood term in software development. In the context of this document, databinding is not limited to a particular technology, language or method. Databinding means that two or more objects are linked to each other with a method so that when the data in one object is changed, these changes are propagated to the other objects that are connected through databinding.

Field—A field can be represented by an input control or part of an input control on a form. As an example a textbox where the user enters the first name would represent the first name field. A field can also be a Check Box, a button, a Radio Button, a File Field, an Image Control an object that accepts drag and drop. A field may also represent a property, cell, node, attribute, element or item of an object, database, spreadsheet, dataset, table, datatable or any structured object containing data. If a form is linked to a database or another object through databinding, a field can reference to both, the field in the form as well as the field in the database or object bound to the form. In the context of this document a field in a control on a form may simply be referred to as a field on a form.

Entry, content, value—All refer to the information entered into a field or control including, but not limited to strings, characters, numbers, files.

Form—Any electronic form including, but not limited to winforms, webforms, javaforms, or browser windows. A form can be any object that allows to capture user input into an electronic device.

Cost—The term "cost" is used in a broader context than just a conventional monetary definition. The term "cost," as used herein, means any measure of the quality of how an electronic form is filled out or any measure of the quality of the data entered into such an electronic form. The term "cost" includes any linear or nonlinear measurement system. The term "cost," as the following paragraphs will explain, may include measures of corrective labor (e.g., days, hours, or minutes), hardware or software processing time, points, rewards, monetary units, made up units or other person or machine or process defined units as well as any other measurement on a linear or non-linear scale. Cost may or may not be justifiable by measurable or accountable underlying numbers. Cost may be completely arbitrary or random or estimates that may later be changed. Also cost may also stand for reward, respectively something positive if the completeness of a form is rewarded.

Or—Unless otherwise specified, whenever in the context of its usage 'or' can be exclusive or inclusive, it is inclusive 'or' (and or).

Message—Unless otherwise specified, Message refers to Error Message.

Use of Capital Letters—The text is not case sensitive, meaning that Upper Case and lower case characters are identical, unless otherwise specified.

Process, Procedure—These words are used synonymously.

FIG. 1 is a schematic illustrating the exemplary embodiments. FIG. 1 illustrates an electronic form or a set of forms 200 containing fields 210. The fields 210 on the form 200 are bound to a database 100 through databinding 110 (also referred to as the form is bound to the database with databinding). As those of ordinary skill in the art understand, the term "databinding" is a standard method of connecting the fields on a form to a database. Database in this context may stand for a relational or non-relational database, datatables, datasets, XML data or any other form of structured data. The exemplary embodiments can also be applied to forms that are not using any databinding. This can be achieved by altering or reducing portions of the exemplary embodiments described here. FIG. 1 also illustrates a Cost Evaluation Manager 300 that manages the cost evaluation process. The Cost Evaluation Manager 300 uses as input parameters the fields 210 of the form(s) 200 or the data that is stored in the database 100 for a specific form 200. The fields or the data can be accessed directly or indirectly for instance by accessing the databinding object 110. Block 400 represents a database or lookuptable (or other form of structured data or formulas) containing information on how to evaluate data in each field of the Form 200 and on the costs in case that the field has an error. The term "cost," for example, is broader than a conventional monetary definition. The term "cost," as used herein, means any measure of the quality of how an electronic form is filled out or the data entered into such an electronic form. Cost may be an estimate or measurement of the corrective actions that need to take place: When a field has an error, the term "cost" may be a monetary value required to correct that erroneous field. The term "cost," however, may be expressed in other terms to denote other measures of erroneous fields. An erroneous field, for example, may require labor time (measured in days, hours, or minutes) to investigate the error and implement or recommend corrective action. An erroneous field may require additional processor time, hardware/server time, or even network bandwidth, so the term "cost" may be a measure of such time or bandwidth. Whatever formatting a field requires (e.g., case sensitive entries, font, colors), the term "cost" may include measures of non-compliant formatting. Cost may be predefined and stored, may be randomly generated or may be the result of a real-time measurement. In the exemplary embodiment costs are in the database or lookuptable 400, which also references a Verification Procedure 500 to be applied to each field. (As a matter of fact, there are several Verification Procedures. The selection of the relevant Verification Procedure will be discussed later). The Verification Procedure 500 contains a set of rules that it applies to the entry into a specific field. These rules determine if the entry into the field (or for that matter no entry in the case of an empty field) is consistent to the rules or not. If the entry is not consistent to the rules, the field or entry into the field or control containing the field is considered to have an error.

In other words, it is the Verification Procedure 500 that applies the rules, but it is the Cost Evaluation Manager 300 that selects the set of rules to be applied by selecting the Verification Procedure to be applied.

Lookuptable 1 illustrates a typical structure of the Cost References database 400. Typically this is structured as in a SQL database, XML file or another structured data storage object. The cost reference block references each field in the Database 100 that is linked to a form 200 through databinding and that is to be evaluated for possible errors. In Lookuptable 1 the TableName and Field together represent the primary key for the lookuptable. Thus for example the TableName of "ApplicantTable" and the Field "CreditRating" reference the Table ApplicantTable in the DataBase 100 and specifically the Field CreditRating.

LOOKUPTABLE 1

| Column Name | Data Type | Sample Record 1 | Sample Record 2 |
|---|---|---|---|
| TableName | String | ApplicantTable | ApplicantTable |
| Field | String | SSN | CreditRating |
| VerificationProcedure | String | ssnProcedure | crProcedure |

LOOKUPTABLE 1-continued

| Column Name | Data Type | Sample Record 1 | Sample Record 2 |
|---|---|---|---|
| DefaultCost | Double | 100 | 50 |
| DefaultMessage | String | Social Security # missing | Please supply credit rating |

The above lookuptable 1 is database-oriented, meaning it addresses the field by referencing the tables in Database 100. It could also be form-oriented and instead reference the fields in a particular form.

LOOKUPTABLE 2

| Column Name | Data Type | Sample Record 1 | Sample Record 2 |
|---|---|---|---|
| FormName | String | ApplicantForm | ApplicantForm |
| Field | String | SSN | CreditRating |
| VerificationProcedure | String | ssnProcedure | crProcedure |
| DefaultCost | Double | 100 | 50 |
| DefaultMessage | String | Social Security # missing | Please supply credit rating |

The lookuptable 2 is form-oriented—instead of retrieving the record based on the database 100 it retrieves the record based on the forms 200. In the case where the form and database are databound and the data is updated this should give the same result. The naming convention when addressing either the database 100 or the form 200 is one way to ensure that corresponding fields (bound by databinding) are clearly identified. A good naming convention as discussed later in this document is helpful in the implementation. In the above sample the ApplicantTable is obviously databound to the ApplicantForm.

Another option is to combine the two lookuptables as in LookupTable 3.

LOOKUPTABLE 3

| Column Name | Data Type | Sample Record 1 | Sample Record 2 |
|---|---|---|---|
| FormName | String | ApplicantForm | ApplicantForm |
| TableName | String | ApplicantTable | ApplicantTable |
| Field | String | SSN | CreditRating |
| VerificationProcedure | String | ssnProcedure | crProcedure |
| DefaultCost | Double | 100 | 50 |
| DefaultMessage | String | Social Security # missing | Please supply credit rating |

The lookuptable may contain additional values such as Minimum or Maximum values that may be used as parameter for the Verification Procedure.

Figure 2:
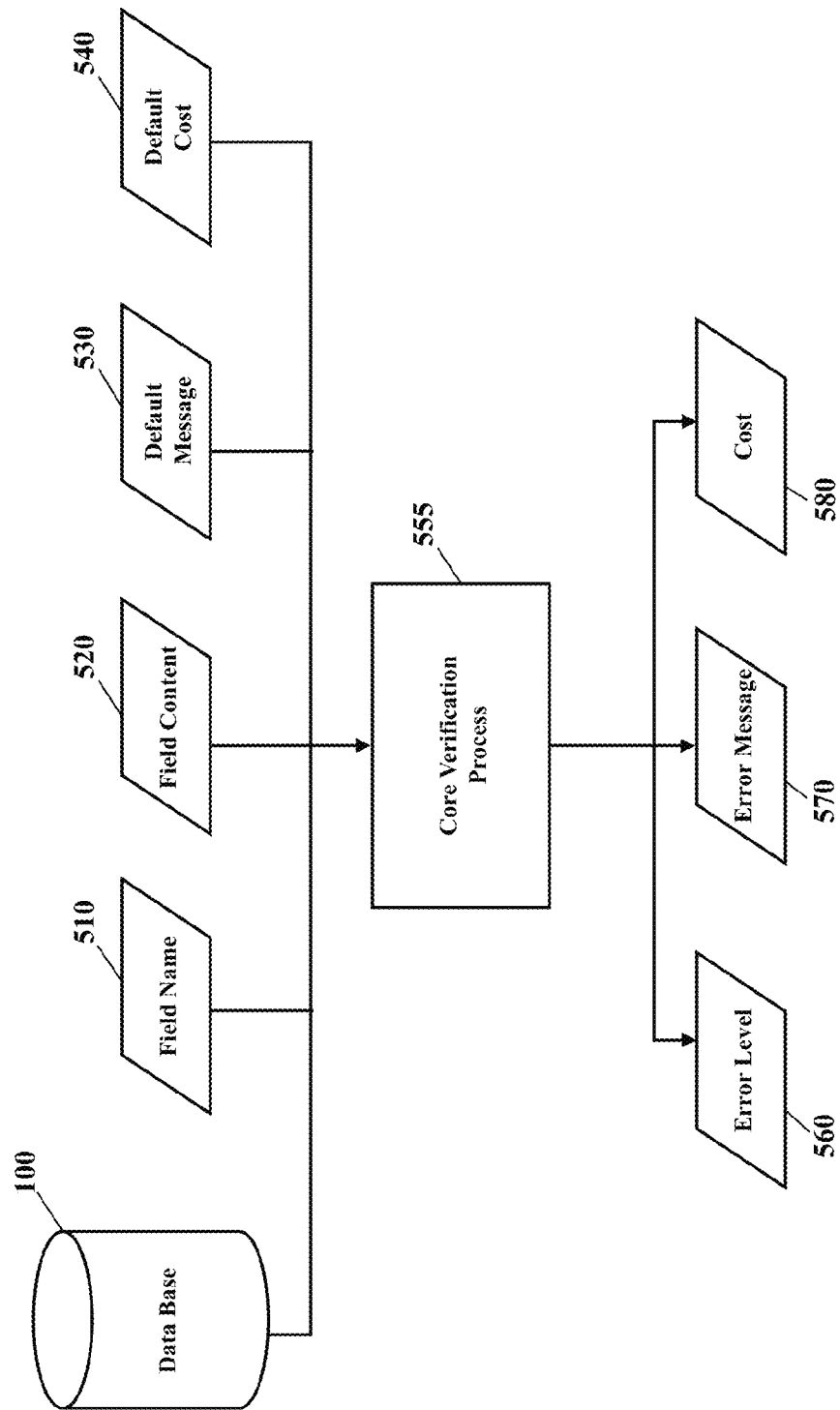
FIG. 2 is a block diagram illustrating a verification procedure utilizing input parameter and output parameter, according to more exemplary embodiments.

FIG. 2 illustrates the Verification Procedure (shown as reference numeral 500 in FIG. 1), according to exemplary embodiments. The Verification Procedure 500 may access the whole content of a form through access to all fields 210 of a form 200 or through access to the database 100. Whenever the database is databound to the form 200, the content in the database (wherever updated) represents the data in the form, and vice versa.

The Verification Procedure 500 has input parameters. Among other purposes these parameters identify the field that is to be verified and it's content. There are various ways to supply this information as parameter, and a Verification Procedure may expose multiple interfaces to cater to several of them. For instance a field may be supplied as object or as shown in FIG. 2 as field name 510 with the field content 520. Other parameters are the default message 530, and the default cost 540. The field could also be referenced by, an index, a key, and/or other identifier. The default message 530 and the default cost 540 are supplied from the Cost References 400. The default message 530 and default cost 540 are values that the Verification Procedure returns, depending on its rules as applied to the entry into the field being verified by the verification procedure. However, a Core Verification Process can override these default values and, instead, return specific values as determined by the rules, methods, and processes specified in the Core Verification Process 555.

The Core Verification Process 555 is a process that actually evaluates the validity of the content or entry in a field. The Core Verification Process contains a set of verification rules. The Core Verification Process can be as simple as a check to verify whether the Field Content to verify is not empty (e.g., non-null). In this simple case of a binary decision, when the verification is positive (meaning the entry in the verified field complies with the rules of the applied Verification Procedure), the Core Verification Process will return an Error Level 560 of zero (0) (e.g., meaning no error), an "empty" Error Message, and zero (0) cost. In the case of a negative verification (meaning a violation of the rules, which is equal to an error), the Core Verification Process will usually return the Default Message 530 and the Default Cost 540 combined with an elevated Error Level 560 of value 1. (Error Level and the use of error levels will be explained later in this document.) Actual values and messages are based on business rules and may be different.

A more sophisticated field may require a more sophisticated Core Verification Process. A field representing a ZIP code, for example, may require that the Core Verification Process compares the Field Content with a third party database to determine whether the Field Content is plausible. The Core Verification Process would have to query the third party database (such as third party vendor's ZIP code database) and receive a response. A still more sophisticated verification may be required by a field containing a subjective, objective, or numerical rating or evaluation, such as a credit rating associated with a social security number, address, name or other identifier. An empty field may indicate that no entry has been made, while a low rating may require additional entries in other fields (such as explanation of bankruptcy). It is for this reason that the Core Verification Process may have access to other fields. The Core Verification Process may also override and/or compliment the Default Message and Default Cost, depending on multiple field entries or on the value of the entry in the field verified. The Core Verification Process may also communicate with other processes, or web services to retrieve parameter or methods for its process or retrieve cost values or messages.

The Verification Process returns one or more values. An Error Level 560 indicates whether the entry in the field complies with the verification rules. An Error Level of 0 means that the entry in the field complies with the verification rules. A positive Error Level (that is, an Error Level>0) indicates that the Field Content is not as expected, indicating an error, meaning a violation of the rules. (These are conventions and different implementations may use different conventions). The Error Message 570 typically indicates how the Field Content is supposed to be or how an error can be corrected. The Cost 580 indicates the cost for the Field Content as is, if no corrective measures were taken.

It is possible to integrate the Cost Evaluation Block into the engine that provides and manages the form. As a matter of fact, the whole cost evaluation can be implemented into each control. This is absolutely a valid solution and anybody with reasonable skills in the art may do that based on this invention. The slightly more complex exemplary embodiments as described, where the Cost Evaluation Block 1000 is separated from the form 200 or from the Database 100, has the additional advantage that the verification of Fields in the form (and fields or entries in the Database) can each be performed independently, but using the same methods and processes.

Figure 3:
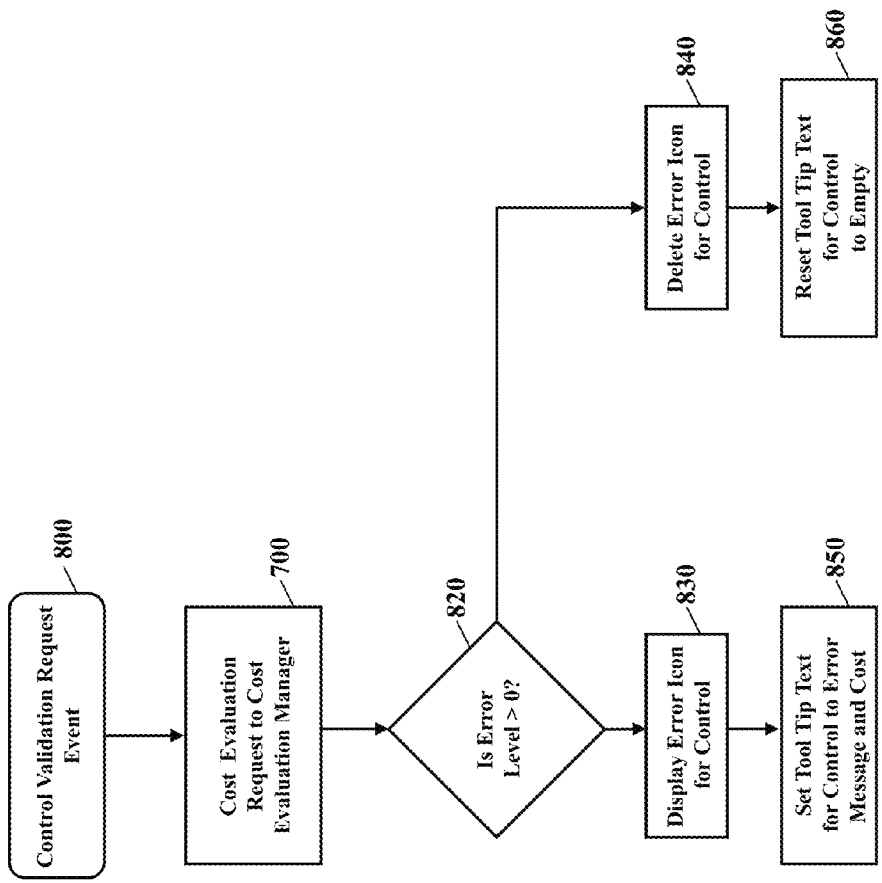
FIG. 3 is a flowchart illustrating a Control Validation Procedure, according to still more exemplary embodiments.

FIG. 3 is a process flow diagram illustrating a Control Validation Procedure, according to the exemplary embodiments. In reference to FIG. 1 this is an interaction between Fields 210 on Forms 200 and the Cost Evaluation Manager 300. The Control Validation Procedure is the procedure that is called to validate a field in a control on a form, to evaluate if the field is filled according to the rules or if it is in violation of the rules and if so to determine the Error Message and Cost and to give this information back to the control containing the field or to another object connected to the field such as an ErrorProvider. The Control Validation Request Event 800 is the starting point into verification of electronic data entered into a field of a control on a form. The Control Validation Procedure shown in FIG. 3 is performed as described by Mr. Bill Hollis, however, the validation process has been modified according to the exemplary embodiments. The Control Validation Request Event 800 is triggered through an event in the control holding one or more fields, for example, when the control loses focus. The Cost Evaluation Request 700 to the Cost Evaluation Manager 300 as described in detail in FIG. 6 returns the Error Level 560, the Error Message 570, and the Cost 580, for the particular field as shown and as described with reference to FIG. 2.

As FIG. 3 illustrates, decision Block 820 determines the flow of the process based on the value of the Error Level returned by the Cost Evaluation Manager 300 (FIG. 1). Recall the convention that a positive Error Level indicates there is an error or rule violation in the content of the field to validate. If the Error Level is >0, then an Error Icon for the Control 830 that represents the field to evaluate will be displayed. Error Icons are often supported by Tooltips. As those of ordinary skill in the art understand, a "Tooltip" is text that displays when a cursor hovers over the Error Icon. Block 850 concatenates the Error Message 570 and the Cost 580 (both of which the Cost Evaluation Manager 300 (FIG. 1) retrieves from the Verification Process as explained in FIG. 2) in a human understandable way to a string and assigns this string to the Tooltip text. In cases when the Error Level is 0 or negative, decision Block 820 leads to the Delete Error Icon Block 840 that deletes or removes the Error Icon. Block 860 follows wherein the Tooltip Text is set to an empty string, indicating that no Tooltip is to be displayed for the control holding the field.

Figure 4:
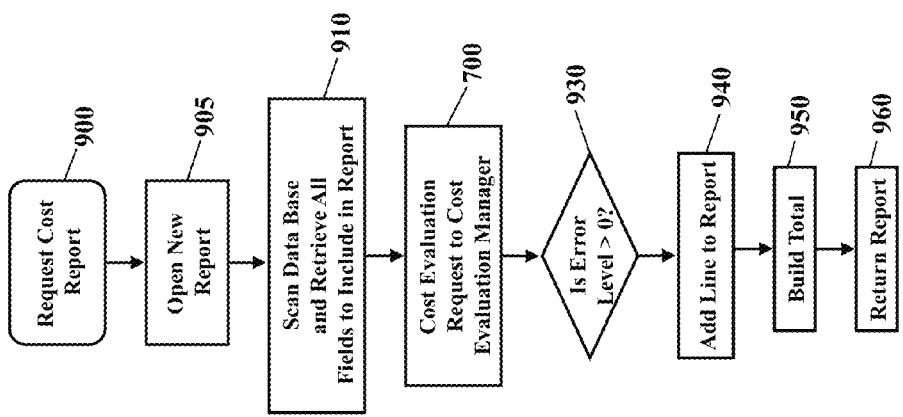
FIG. 4 is a flowchart illustrating a report generator, according to exemplary embodiments.

FIG. 4 illustrates the generation of a Cost Report, according to the exemplary embodiments. The exemplary embodiments have the ability to treat forms much more subtly than simply classifying them as "valid" or "invalid," based on the entries into the fields. Measuring the cost of each field or a selection of fields on a form allows building an aggregate total cost for the quality of the data entered into the form. The exemplary embodiments, then, may produce a report to provide information about the status and quality of a form or set of forms, regardless of whether the form or set of forms has (have) been submitted or whether it is prior to submission. If the content of the report has been forwarded to another object, a bound database for instance, the report may also be based on that object. Such a report may be generated upon request by a user, or it may be built based on some events such as changes in fields. It may also be generated based on a timer event. It may be displayed on a monitor or screen or printed or forwarded or stored in any format.

FIG. 4, then, illustrates a process flow that creates a Cost Report. A cost Report is created by retrieving the data from the Database. With some modifications to Block 910 this could also be done by retrieving the data from the fields in the form or set of forms or any other object holding the data to be verified rather than relying on the data from the database. FIG. 4 starts with the Request Cost Report Block 900. A new empty Report is created in Block 905. Block 910 retrieves a collection of all the relevant fields for the respective Report. The cursor is moved to the record in the table (or records in tables if multiple tables are used) for the report to evaluate. All the fields in the record are retrieved. For each field a Cost Evaluation Request 700 (FIG. 6) to the Cost Evaluation Manager 300 (FIG. 1) is performed. If no Verification Procedure is defined for a particular field, then this field is assumed to have no error (Error Level=0). The decision Block 930 only forwards the responses and fields (or identification of fields) for the fields with an Error Level>0 to Block 940. Block (940) adds a line to the report describing the cost implications. Using the ZIP code example mentioned above, Block 940 might visually or audibly present information such as "Zip Code: 44444 is not a valid Zip code. Cost: 25." Whereas Zip Code represents the field in the Form, "44444" represents the value entered into the field and "25" represents the cost associated with submitting an invalid Zip code. Block 940 may or may not dynamically produce this information at runtime. "Zip Code" comes from the field (it may be the field name or a name retrieved from a lookup table), and "44444" is the value of the field. The text "is not a valid Zip code" may be the Default Message 530 passed through the Core Verification Process 555 as Error Message 570. The text, however, may alternatively or additionally be another string composed in the Core Verification Process and returned as Error Message 570. The last term "Cost:" is added by Block 940 and "25" is the Cost 580 supplied by the Verification Procedure 500 through the Cost Evaluation Manager 300. Notice that Block 700, 930 and 940 are executed for each field to verify. Block 950 adds up all the costs for one Form and builds a total, thus evaluating the total cost for the current level of completion of the Form. Block 960 then returns the report for the Form. If there is a set of forms, the reports for the relevant forms can be joined together into one meta-report. In addition to or in replacement of reporting each field with its related Cost a total for the Cost for a form, a subset of a form or a set of forms can be built and reported. The total is built with an aggregate function. The aggregate function can be as simple as building the sum of the costs to aggregate or it may involve a more complicated function.

Figure 5:
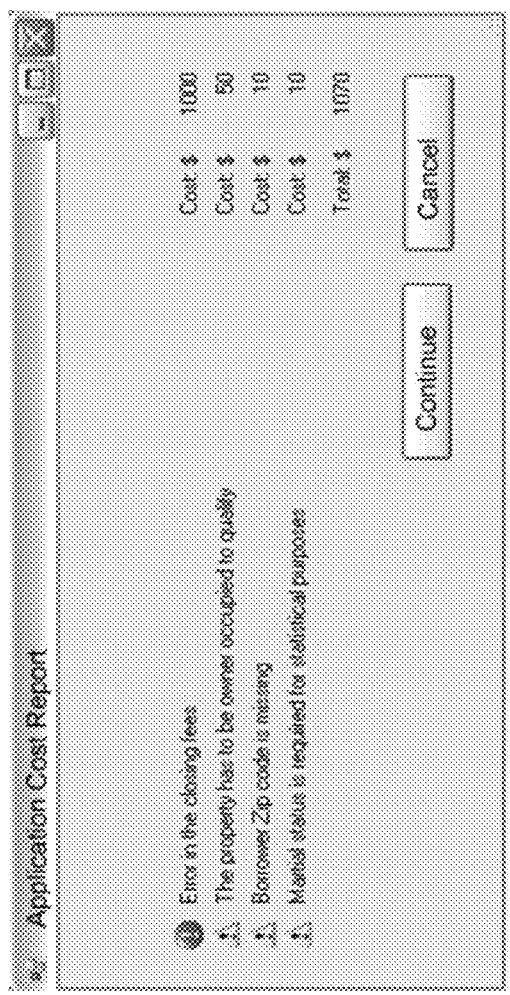
FIG. 5 is a screenshot of a report, according to exemplary embodiments.

Cost may be presented in any visual, audible, or tactile way. Instead of reporting the Cost as a number, any other form of communication or visualization may be used, including but not limited to icons, colors, graphs, instruments or a combination thereof. A slightly more sophisticated version uses both icons and numbers to report errors. FIG. 5 is a screenshot showing such a report. FIG. 5 also indicates one use of such a report. When submitting information or a form, a warning window pops up, gives an error report and a cost estimate and prompts or asks if the user wants to continue and accept the costs. To people with skills in the art it is not difficult to sort and order the report as in this screenshot, where it is sorted according to the cost.

Figure 6:
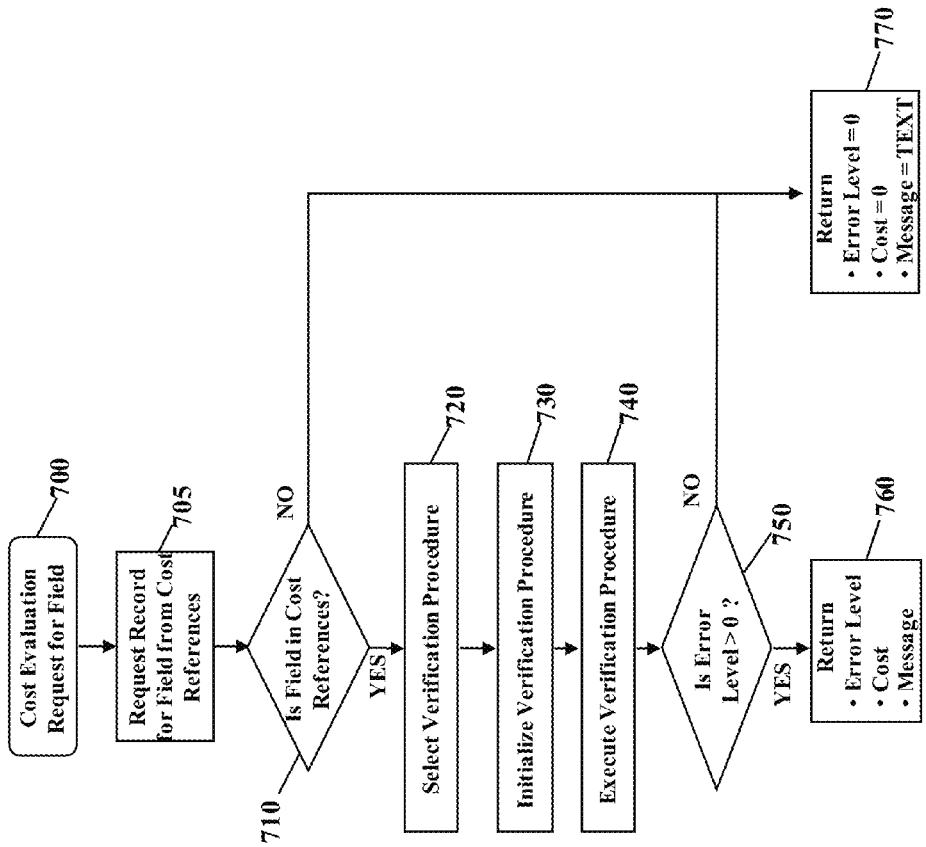
FIG. 6 is a flowchart illustrating a verification and/or Cost Evaluation Procedure, according to yet more exemplary embodiments.

FIG. 6 is a process flow diagram illustrating how the Cost Evaluation Manager 300 processes a request to evaluate the content of a field. The example data for explaining FIG. 6 partly refers to LookupTable 1. As an example the Cost Evaluation Manager 300 has to process a request to evaluate the entry in the field "CreditRating" of the Table with the Name "ApplicantTable." Once the Cost Evaluation Manager 300 (FIG. 1) gets a request 700 to evaluate the above mentioned field, it requests the Cost References 400 for the relevant record relating to the particular field (symbolized in Block 705). For this example the request to the LookupTable 1 with the where clause "TableName='ApplicantTable' AND Field='CreditRating'" will return Sample Record 2 with the values: Verification Procedure='crProcedur', Default Cost=50, DefaultMessage='Please supply credit rating'. Remember that crProcedure only is the name or reference to the Verification Procedure 500 out of all the Verification Procedures available. The Cost Evaluation Manager 300 will load the corresponding Verification Procedure 500.

FIG. 6 also illustrates a Decision Block (symbolized as 710). If the Field is not referenced in the Cost References 400 (meaning no record is returned from Cost References 400), then no Error Level can be set nor can a Cost be associated to the entry into the field, nor can a message be supplied. In this case the Decision Block 710 routs directly to Block 770, which resets the Error Level and the Cost to 0 and empties the Message. If, however, the Record is not empty, then the Decision Block 710 will rout the process to Block 720 where the corresponding Verification Procedure as referenced in the Record is selected. In our example this would be the crProcedure (This is the VerificationProcedure referenced in Record Sample 2 in the LookupTable 1 as defined by TableName='ApplicantTable' AND Field='CreditRating'. The Verification Procedure is next initialized in block 730 and the Verification Procedure is executed in Block 740. The structure of the Object that performs the Verification Procedure and the parameters passed to and from the object are outlined in FIG. 2 (and explained above). The returned values from the Verification Procedure are first analyzed in the Decision Block 750. If the Error Level is 0 or less, then the Decision Block 750 routs the process to the aforementioned Block 770. If the Error Level is >0 then the process continues to Block 760 and returns the Error Level, Error Message and Cost as received from the Verification Procedure.

The exemplary embodiments may utilize field relationships. The cost evaluation process, for example, may need to know any relationship between the Fields 210 in the Form 200 and the Fields in the Database 100. This relationship, if any, may be obtained through different means. For one, the DataBinding Block 110 may also obtain the relationship, so the Cost Evaluation Process could get the relationship information from there. Another means is through naming convention. Such a convention might be to require that the columns in the tables of the DataBase 100 are named with the same name as the corresponding Field Names in the Forms. A convention of using the same names may simplify the implementation. When doing so, special care has to be taken, to avoid multiple fields with identical name.

The exemplary embodiments may also use various error levels. The above paragraphs describe the Error Level as a binary value, e.g., 0, positive (>0), or negative (<0). A more sophisticated implementation, however, may be used that assigns different values indicating the gravity of an error—which need not to correlate with the cost. The exemplary embodiments could even be implemented without the use or Error Levels at all, such as deciding based on the Cost if a field has an error or not. For some applications this may be the most practical solution. The use of a measurement independent of the Cost has additional advantages. The Error Level can be used to control the flow of the program and possibly stop the flow even though no Cost was involved. This is particularly helpful if the Cost is defined by a user. The user may assign no Cost at all to a particular field, yet the program flow may require a particular value or else an exception would be thrown. Assigning different Error Levels can help to manage this situation. As an example, a rule may be implemented that requires a user to change the entry in a field with an Error Level of 3, independent of the cost, allowing for a flow control based on the Error Level.

The exemplary embodiments may require immediate payment for erroneous fields. As the above paragraphs explain, the exemplary embodiments evaluate the cost of a field that contains erroneous data. As the above paragraphs also explained, each data field has an associated "cost" when non-conforming data is entered. When the cost is monetary, the exemplary embodiments may require immediate payment. That is, when an electronic form contains erroneous data fields, the exemplary embodiments may prompt a user to make a payment for the costs to rectify the erroneous data. The exemplary embodiments, for example, may prompt a user for a credit card number, bank account, routing number, or other information for an e-commerce payment. An airline, hotel, car rental agency, or any other entity might require redemption of "points" to rectify an erroneous data submission. Moreover, money, points, or other rewards might be offered when a user submits an electronic form with a low total cost associated, meaning that the data is well or nearly well formatted, with data of a high degree of completeness, with no or only few missing/blank fields, or all or almost all needed attachments. The exemplary embodiments may then call or process an e-commerce transaction that reflects the cost of erroneous data or a payment/reward for complete data. Or the Costs may be accumulated over time and be invoiced later or included in a reward system.

The exemplary embodiments may operate within any computer or other communications device. The Cost Evaluation Manager, Cost References, Verification Procedure, and Report Generator (shown, respectively, as reference numerals 300, 400, 500, and 600 in FIG. 1) are one or more sets of instructions that are executed by a processor, application specific integrated circuit (ASIC), or other component or device. These instructions may operate within, or be stored within, a set-top box, a personal/digital video recorder, personal digital assistant, a Global Positioning System device, a television, an Internet Protocol phone, a pager, a cellular/satellite phone, or any computer system and/or communications device. The instructions may also operate within, or be stored within, watches, radios, vehicle electronics, clocks, printers, gateways, and other apparatuses and systems. The embodiments do not need to be implemented in one single device. Blocks or parts of blocks may reside in different machines or in different locations as long as they can communicate with each other. Such communication may be done through the web, web services, the Ethernet, wireless communication, or wired communication.

The exemplary embodiments, however, are simply illustrated. Because the architecture and operating principles of communications devices are well known, the hardware and software components of computers and other communications devices are not further shown and described. If the reader desires more details, the reader is invited to consult the following sources, all incorporated herein by reference in their entirety: ANDREW TANENBAUM, COMPUTER NETWORKS (4$^{th}$ edition 2003); WILLIAM STALLINGS, COMPUTER ORGANIZATION AND ARCHITECTURE: DESIGNING FOR PERFORMANCE (7$^{th}$ Ed., 2005); and DAVID A. PATTERSON & JOHN L. HENNESSY, COMPUTER ORGANIZATION AND DESIGN: THE HARDWARE/SOFTWARE INTERFACE (3$^{rd}$. Edition 2004).

The exemplary embodiments may be physically embodied on or in a computer-readable media or medium. This computer-readable media or medium may include CD-ROM, DVD, tape, cassette, floppy disk, memory card, and large-capacity disk (such as IOMEGA®, ZIP®, JAZZ®, and other large-capacity memory products (IOMEGA®, ZIP®, and JAZZ® are registered trademarks of Iomega Corporation, 1821 W. Iomega Way, Roy, Utah 84067, 801.332.1000, www.iomega.com). This computer-readable medium, or media, could be distributed to end-users, licensees, and assignees. These types of computer-readable media, and other types not mention here but considered within the scope of the exemplary embodiments, allow the exemplary embodiments to be easily disseminated. A computer program product comprises executable instructions stored on the computer-readable media or medium.

While the exemplary embodiments have been described with respect to various features, aspects, and embodiments, those skilled and unskilled in the art will recognize the exemplary embodiments are not so limited. Other variations, modifications, and alternative embodiments may be made without departing from the spirit and scope of the exemplary embodiments.

The invention claimed is:

1. A method, comprising:
  receiving, at a server, electronic data entered into a data field associated with an electronic mortgage application form, the electronic mortgage application form sent from a device associated with a network address;
  determining, by the server, a data field name assigned to the data field in the electronic mortgage application form;
  querying, by the server, an electronic database for the data field name assigned to the data field in the electronic mortgage application form, the electronic database having electronic associations between evaluation rules and data field names in the electronic mortgage application form;
  retrieving, by the server, an evaluation rule of the evaluation rules from the electronic database, the evaluation rule electronically associated with the data field name assigned to the data field;
  determining, by the server, an error in the electronic data entered into the data field, the error based on the evaluation rule that is electronically associated with the data field name;
  retrieving, by the server, a cost to correct the error in the electronic data entered into the data field; and
  sending, from the server, a prompt to the device associated with the network address, the prompt requesting a payment of the cost to correct the error in the electronic data entered into the data field associated with the electronic mortgage application form.

2. The method of claim 1, further comprising prompting for a credit card number for the payment of the cost to correct the error.

3. The method of claim 2, further comprising processing the credit card number.

4. The method of claim 1, further comprising receiving a credit card number for the payment of the cost to correct the error.

5. The method of claim 1, further comprising correcting the electronic data entered into the data field associated with the electronic mortgage application form.

6. The method of claim 1, further comprising selecting the evaluation rule.

7. A system, comprising:
a hardware processor; and
a memory device, the memory device storing instructions, the instructions when executed causing the hardware processor to perform operations, the operations comprising:
receiving electronic data entered into a data field associated with an electronic mortgage application form, the electronic mortgage application form sent from a device associated with a network address;
determining a data field name assigned to the data field in the electronic mortgage application form;
querying an electronic database for the data field name assigned to the data field in the electronic mortgage application form, the electronic database having electronic associations between different evaluation rules and different data field names in the electronic mortgage application form;
retrieving an evaluation rule of the different evaluation rules from the electronic database, the evaluation rule electronically associated with the data field name assigned to the data field;
determining an error in the electronic data entered into the data field, the error based on the evaluation rule electronically associated with the data field name;
retrieving a cost to correct the error in the electronic data entered into the data field; and
sending a prompt to the device associated with the network address, the prompt requesting a payment of the cost to correct the error in the electronic data entered into the data field associated with the electronic mortgage application form.

8. The system of claim 7, wherein the operations further comprise prompting for a credit card number as the payment.

9. The system of claim 7, wherein the operations further comprise processing an electronic payment of the cost to correct the error.

10. The system of claim 7, wherein the operations further comprise processing a credit card number as the payment of the cost to correct the error.

11. The system of claim 7, wherein the operations further comprise selecting the evaluation rule retrieved from the electronic database.

12. The system of claim 11, wherein the operations further comprise correcting the electronic data entered into the data field associated with the electronic mortgage application form.

13. A memory device storing instructions that when executed cause a hardware processor to perform operations, the operations comprising:
receiving electronic data entered into a data field associated with an electronic mortgage application form, the electronic mortgage application form sent from a device associated with a network address;
determining a data field name assigned to the data field in the electronic mortgage application form;
querying an electronic database for the data field name assigned to the data field in the electronic mortgage application form, the electronic database having electronic associations between different evaluation rules and different data field names in the electronic mortgage application form;
retrieving an evaluation rule of the different evaluation rules from the electronic database, the evaluation rule electronically associated with the data field name assigned to the data field;
determining an error in the electronic data entered into the data field, the error based on the evaluation rule information retrieved from the electronic database that is electronically associated with the data field name;
retrieving a cost to correct the error in the electronic data entered into the data field; and
sending a prompt to the device associated with the network address, the prompt requesting a payment of the cost to correct the error in the electronic data entered into the data field associated with the electronic mortgage application form.

14. The memory device of claim 13, wherein the operations further comprise prompting for a credit card number as the payment of the cost to correct the error.

15. The memory device of claim 13, wherein the operations further comprise processing an electronic payment of the cost to correct the error.

16. The memory device of claim 13, wherein the operations further comprise processing a credit card number as the payment of the cost to correct the error.

17. The memory device of claim 13, wherein the operations further comprise correcting the electronic data entered into the data field associated with the electronic mortgage application form.

18. The memory device of claim 13, wherein the operations further comprise applying the evaluation rule to the electronic data entered into the data field.

* * * * *